(12) United States Patent
Bollobas et al.

(10) Patent No.: US 7,647,215 B2
(45) Date of Patent: Jan. 12, 2010

(54) MODELING DIRECTED SCALE-FREE OBJECT RELATIONSHIPS

(75) Inventors: Bela S. Bollobas, Germantown, TN (US); Jennifer Tour Chayes, Seattle, WA (US); Christian Herwarth Borgs, Seattle, WA (US); Oliver Maxim Riordan, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 551 days.

(21) Appl. No.: 11/608,737

(22) Filed: Dec. 8, 2006

(65) Prior Publication Data

US 2007/0083347 A1    Apr. 12, 2007

Related U.S. Application Data

(63) Continuation of application No. 10/421,385, filed on Apr. 23, 2003, now abandoned.

(60) Provisional application No. 60/463,792, filed on Apr. 18, 2003.

(51) Int. Cl.
*G06F 17/10* (2006.01)
(52) U.S. Cl. .......................................................... 703/2
(58) Field of Classification Search ...................... 703/2
See application file for complete search history.

(56) References Cited

U.S. PATENT DOCUMENTS 6,064,971 A    5/2000    Hartnett

FOREIGN PATENT DOCUMENTS

JP    11096134 A    4/1999

OTHER PUBLICATIONS

OA Dated Dec. 16, 2008 for U.S. Appl. No. 10/421,385, 12 pages.
OA Dated Sep. 17, 2008 for U.S. Appl. No. 10/421,385, 24 pages.
M. Fiedler, A Property of Eigenvectors of Nonnegative Symmetric Matrices and Its Application to Graph Theory, Czechoslovak Mathematical Journal, 1975, pp. 619-633, Praha.
D. Gibson, et al., Inferring Web Communities from Link Topology, Proceedings of the 9th ACM Conference on Hypertext and Hypermedia, Jun. 1998, pp. 1-17, Pittsburgh, Pennsylvania.
H. Simon, Partitioning of Unstructured Problems for Parallel Processing, Computing Systems in Engineering, 1991, pp. 1-14.
D. Spielman, et al., Spectral Partitioning Works: Planar Graphs and Finite Element Meshes, IEEE Symposium on Foundations of Computer Science, Feb. 13, 1996, pp. 1-34.
Rodgers, et al.; Properties of a growing random directed network; European Physical Journal, pp. 1-13; 2001.
Aiello, et al.; Random evolution in massive graphs, Proc. FOCS, pp. 1-39, 2001.
Bela Bollabas, et al., Directed Scale-Free Graphs, Proceedings of the fourteenth annual ACM-SIAM symposium on Discrete algorithms, 2003, pp. 132-139, Baltimore, Maryland.
Linyuan Lu, et al., The Diameter of Random Massive Graphs, Proceedings of the twelfth annual ACM-SIAM symposium on Discrete algorithms, 2001, pp. 912-921, Washington, D.C., United States.
William Aiello, et al., A Random Graph Model for Massive Graphs, STOC'2000, 2000, pp. 1-10, Oregon, Portland.
Chris Ding H.Q., "Analysis of gene expression profiles: class discovery and leaf ordering", RECOMB 2002, pp. 127-136, Apr. 2002, Washington, D.C.
O'Riordan, et al., "An intelligent agent for high-precision text filtering", CIKM '95, pp. 205-211, 1995 ACM.

(Continued)

*Primary Examiner*—Hugh Jones
(74) *Attorney, Agent, or Firm*—Lee & Hayes, PLLC (57) ABSTRACT

Systems and methods for generating models of directed scale-free object relationships are described. In one aspect, a sequence of random numbers is generated. Individual ones of these random numbers are then selected over time to generate the directed scale-free object relationships as a graph based on sequences of in-degrees and out-degrees.

19 Claims, 4 Drawing Sheets

OTHER PUBLICATIONS

Ding, et al., "A min-max cut algorithm for graph partitioning and data clustering", ICDM 2001, Proceedings IEEE International Conference, Nov. 29-Dec. 2, 2001, pp. 107-114.

Kiyomitsu, et al., "Access Management for Dynamic Web Contents Based on User's Navigation over Hypertext Documents", Technical Report of IEICE, vol. 99, No. 201, The Institute of Electronics, Information and Communication Engineers, Japan, Jul. 21, 1999, pp. 85-90.

MODELING DIRECTED SCALE-FREE OBJECT RELATIONSHIPS

CROSS REFERENCE TO RELATED APPLICATIONS

This application is a continuation of U.S. patent application Ser. No. 10/421,385, filed on Apr. 23, 2003, entitled "MODELING DIRECTED SCALE-FREE OBJECT RELATIONSHIPS", which claims priority to U.S. Patent Application Ser. No. 60/463,792, filed on Apr. 18, 2003, entitled "GENERATING MODELS FOR DIRECTED SCALE-FREE INTER-OBJECT RELATIONSHIPS". This application is also related to U.S. patent application Ser. No. 10/603,034, filed on Jun. 24, 2003, entitled "NEWS GROUP CLUSTERING BASED ON CROSS-POST GRAPH". The entireties of the aforementioned applications are incorporated herein by reference.

TECHNICAL FIELD

The invention pertains to generating models for growth and distribution of directed scale-free object relationships.

BACKGROUND

Many new processes for generating distributions of random graphs have been introduced and analyzed, inspired by certain common features observed in many large-scale real-world graphs such as the "web graph", whose vertices are web pages with a directed edge for each hyperlink between two web pages. For an overview see the survey papers [2] and [15] of the Appendix. Other graphs modeled are the "internet graph" [18], movie actor [28] and scientific [25] collaboration graphs, cellular networks [21], and so on.

In addition to the "small-world phenomenon" of logarithmic diameter investigated originally in the context of other networks by Strogatz and Watts [28], one of the main observations is that many of these large real-world graphs are "scale-free" (see references [5, 7, 24] of the Appendix), in that the distribution of vertex degrees follows a power law, rather than the Poisson distribution of the classical random graph models G(n, p) and G(n, M) [16, 17, 191, see also [9]. Many new graph generators have been suggested to try to model such scale-free properties and other features, such as small diameter and clustering, of real-world events, phenomena, and systems that exhibit dynamically developing object relationships such as that presented by the Worldh aWide Web (WWW). Unfortunately, such existing generators produce models that are either completely undirected or, at most, semi-, or uni-directional (i.e., either in-degrees or out-degrees are treated, but not both simultaneously), and/or have a statically predetermined degree distribution.

In light of this, existing techniques for generating graphs do not provide realistic treatments of dynamically generated scale-free graphs with directed object relationships (i.e., link(s) from one object to another) that develop in a way depending on both links out-of and into an object. As such, conventional generation techniques do not adequately represent specific or fully modeled simulations of scale-free, directed object relationships that may exist in nature and/or other dynamic environments such as the WWW.

In view of these limitations, systems and methods for generating models of directed scale-free graphs or dynamic communities of relationships (e.g., network topologies) are greatly desired. Such generators could be used, e.g., to generate sample directed network topologies on which directed internet routing protocols are tested, or to generate sample web graphs on which search algorithms are tested.

SUMMARY

Systems and methods for generating models of directed scale-free object relationships are described. In one aspect, a sequence of random numbers is generated. Individual ones of these random numbers are then selected over time to generate the directed scale-free object relationships as a graph based on sequences of in-degrees and out-degrees.

BRIEF DESCRIPTION OF THE DRAWINGS

The following detailed description is given with reference to the accompanying figures. In the figures, the left-most digit of a component reference number identifies the particular figure in which the component first appears.

DETAILED DESCRIPTION

Overview

The following systems and methods generate directed scale-free modeling of object relationships. This is accomplished through the simultaneous treatment of both in-degrees and out-degrees (bidirectional) to provide a very natural model for generating graphs with power law degree distributions. Depending on the characteristics of the entity or the abstraction being modeled, power laws can be different for in-degrees and out-degrees. Such modeling is consistent with power laws that have been observed, for example, in nature and in technological communities (e.g., directed hyperlinks among web pages on the WWW, connections among autonomous systems on the AS internet, connections among routers on the internet, etc.).

Exemplary Operating Environment

Turning to the drawings, wherein like reference numerals refer to like elements, the invention is illustrated as being implemented in a suitable computing environment. Although not required, the invention is described in the general context of computer-executable instructions, such as program modules, being executed by a personal computer. Program modules generally include routines, programs, objects, components, data structures, etc., that perform particular tasks or implement particular abstract data types.

Figure 1:
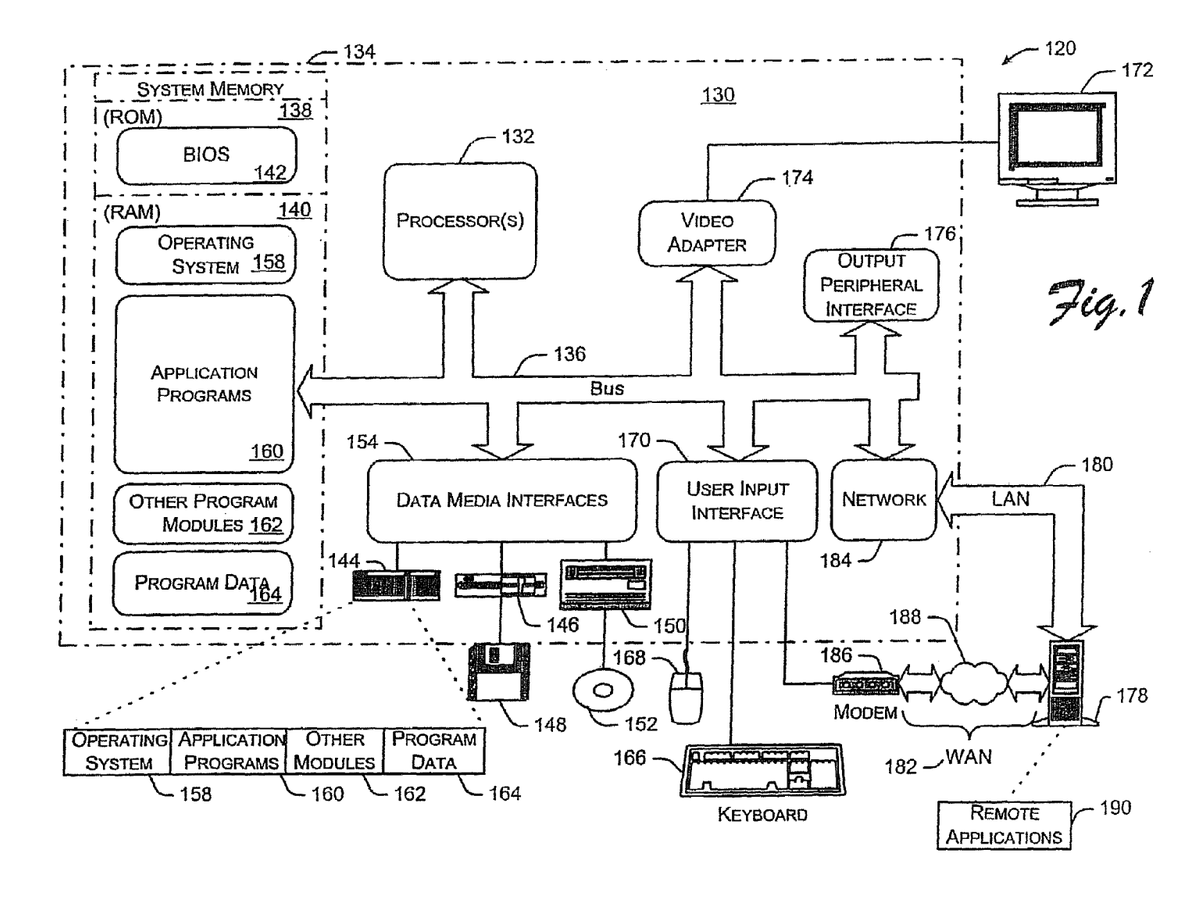
FIG. 1 is a block diagram of an exemplary computing environment within which systems and methods for generating models of directed scale-free object relationships may be implemented.

FIG. 1 illustrates an example of a suitable computing environment 120 on which the subsequently described systems, apparatuses and methods to generate directed scale-free network topologies may be implemented. Exemplary computing environment 120 is only one example of a suitable computing environment and is not intended to suggest any limitation as to the scope of use or functionality of the systems and methods described herein. Neither should computing environment 120 be interpreted as having any dependency or requirement relating to any one or combination of components illustrated in computing environment 120.

The methods and systems described herein are operational with numerous other general purpose or special purpose computing system environments or configurations. Examples of well known computing systems, environments, and/or configurations that may be suitable include, but are not limited to, hand-held devices, symmetrical multi-processor (SMP) systems, microprocessor based or programmable consumer electronics, network PCs, minicomputers, mainframe computers, portable communication devices, and the like. The invention may also be practiced in distributed computing environments where tasks are performed by remote processing devices that are linked through a communications network. In a distributed computing environment, program modules may be located in both local and remote memory storage devices.

As shown in FIG. 1, computing environment 120 includes a general-purpose computing device in the form of a computer 130. Computer 130 includes one or more processors 132, a system memory 134, and a bus 136 that couples various system components including system memory 134 to processor 132. Bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computer 130 typically includes a variety of computer readable media. Such media may be any available media that is accessible by computer 130, and it includes both volatile and non-volatile media, removable and non-removable media. In FIG. 1, system memory 134 includes computer readable media in the form of volatile memory, such as random access memory (RAM) 140, and/or non-volatile memory, such as read only memory (ROM) 138. A basic input/output system (BIOS) 142, containing the basic routines that help to transfer information between elements within computer 130, such as during start-up, is stored in ROM. RAM typically contains data and/or program modules that are immediately accessible to and/or presently being operated on by processor(s) 132.

Computer 130 may further include other removable/non-removable, volatile/non-volatile computer storage media. For example, FIG. 1 illustrates a hard disk drive 144 for reading from and writing to a non-removable, non-volatile magnetic media (not shown and typically called a "hard drive"), a magnetic disk drive 146 for reading from and writing to a removable, non-volatile magnetic disk 148 (e.g., a "floppy disk"), and an optical disk drive 150 for reading from or writing to a removable, non-volatile optical disk 152 such as a CD-ROM/R/RW, DVD-ROM/R/RW/+R/RAM or other optical media. Hard disk drive 144, magnetic disk drive 146 and optical disk drive 150 are each connected to bus 136 by one or more interfaces 154.

The drives and associated computer-readable media provide nonvolatile storage of computer readable instructions, data structures, program modules, and other data for computer 130. Although the exemplary environment described herein employs a hard disk, a removable magnetic disk 148 and a removable optical disk 152, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk, magnetic disk 148, optical disk 152, ROM 138, or RAM 140, including, e.g., an operating system (OS) 158 to provide a runtime environment, one or more application programs 160, other program modules 162, and program data 164.

A user may provide commands and information into computer 130 through input devices such as keyboard 166 and pointing device 168 (such as a "mouse"). Other input devices (not shown) may include a microphone, joystick, game pad, satellite dish, serial port, scanner, camera, etc. These and other input devices are connected to the processing unit 132 through a user input interface 170 that is coupled to bus 136, but may be connected by other interface and bus structures, such as a parallel port, game port, or a universal serial bus (USB).

A monitor 172 or other type of display device is also connected to bus 136 via an interface, such as a video adapter 174. In addition to monitor 172, personal computers typically include other peripheral output devices (not shown), such as speakers and printers, which may be connected through output peripheral interface 176.

Computer 130 may operate in a networked environment using logical connections to one or more remote computers, such as a remote computer 178. Remote computer 178 may include many or all of the elements and features described herein relative to computer 130. Logical connections shown in FIG. 1 are a local area network (LAN) 180 and a general wide area network (WAN) 182. Such networking environments are commonplace in offices, enterprise-wide computer networks, intranets, and the Internet.

When used in a LAN networking enviromnent, computer 130 is connected to LAN 180 via network interface or adapter 184. When used in a WAN networking environment, the computer typically includes a modem 186 or other means for establishing communications over WAN 182. Modem 186, which may be internal or external, may be connected to system bus 136 via the user input interface 170 or other appropriate mechanism.

Depicted in FIG. 1, is a specific implementation of a WAN via the Internet. Here, computer 130 employs modem 186 to establish communications with at least one remote computer 178 via the Internet 188.

In a networked environment, program modules depicted relative to computer 130, or portions thereof, may be stored in a remote memory storage device. Thus, e.g., as depicted in FIG. 1, remote application programs 190 may reside on a memory device of remote computer 178. It will be appreciated that the network connections shown and described are exemplary and other means of establishing a communications link between the computers may be used.

Figure 2:
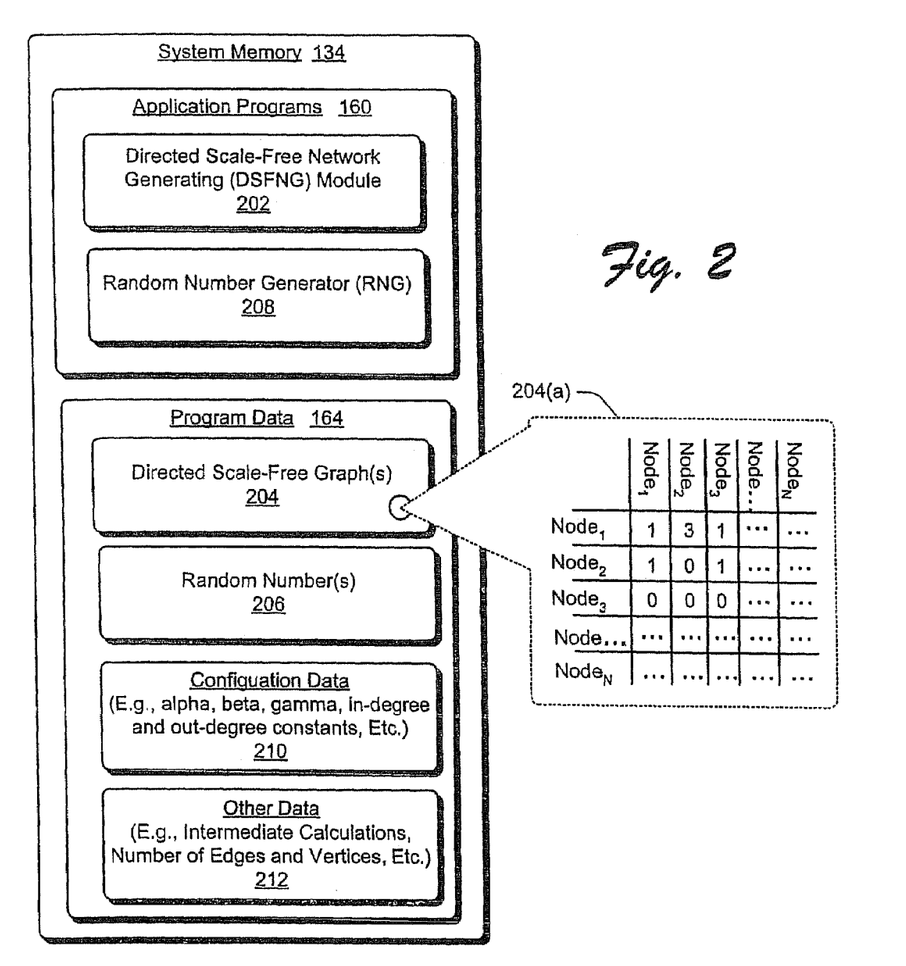
FIG. 2 is a block diagram that shows further exemplary aspects of system memory of FIG. 1, including application programs and program data for generating models of directed scale-free object relationships.

FIG. 2 is a block diagram that shows further exemplary aspects of system memory 134 of FIG. 1, including application programs 160 and program data 164. Application programs 160 include, for example, a Directed Scale-Free Object Relationship Network Generating Module 202 to generate a Directed Scale-Free Graph 204 (hereinafter often referred to as the "graph"). Each graph 204 represents vertices and edges between respective vertices that have been added to the graph by the network generating module 202 during discrete iterative operations that are performed over time t. Before turning to more detailed aspects of the algorithms used to generate the graph 204, exemplary structure and elements of a graph 204 are described in reference to graph 204(*a*).

Graph 204(a) is represented as a matrix, wherein each horizontal row i and vertical column j of the matrix corresponds to a respective vertex, or node (i.e., $node_1$ through $node_N$). Thus, i=1 ... N, and j=1 ... N. (Hereinafter, the terms node and nodes are often used interchangeably with the terms vertex and vertices). To grow graph 204(a) from some number of nodes to a greater number of nodes, the network generating module 202 adds a node to the graph 204(a). This means that a row and a column representing the new node are added to the graph 204(a). The (i,j) element E(i,j) of the graph 204(a) represents the number of directed edges or connections from node i to node j, modeling e.g., the number of hyperlinks from web page i to web page j, or a directed transfer of E(i,j) objects or characteristics from entity i to entity j (such as the transfer of money and goods between a merchant and a buyer), and/or the like.

In the representation 204(a), we have adopted the convention that edge direction is evaluated from the row-node to the column-node.

Figure 3:
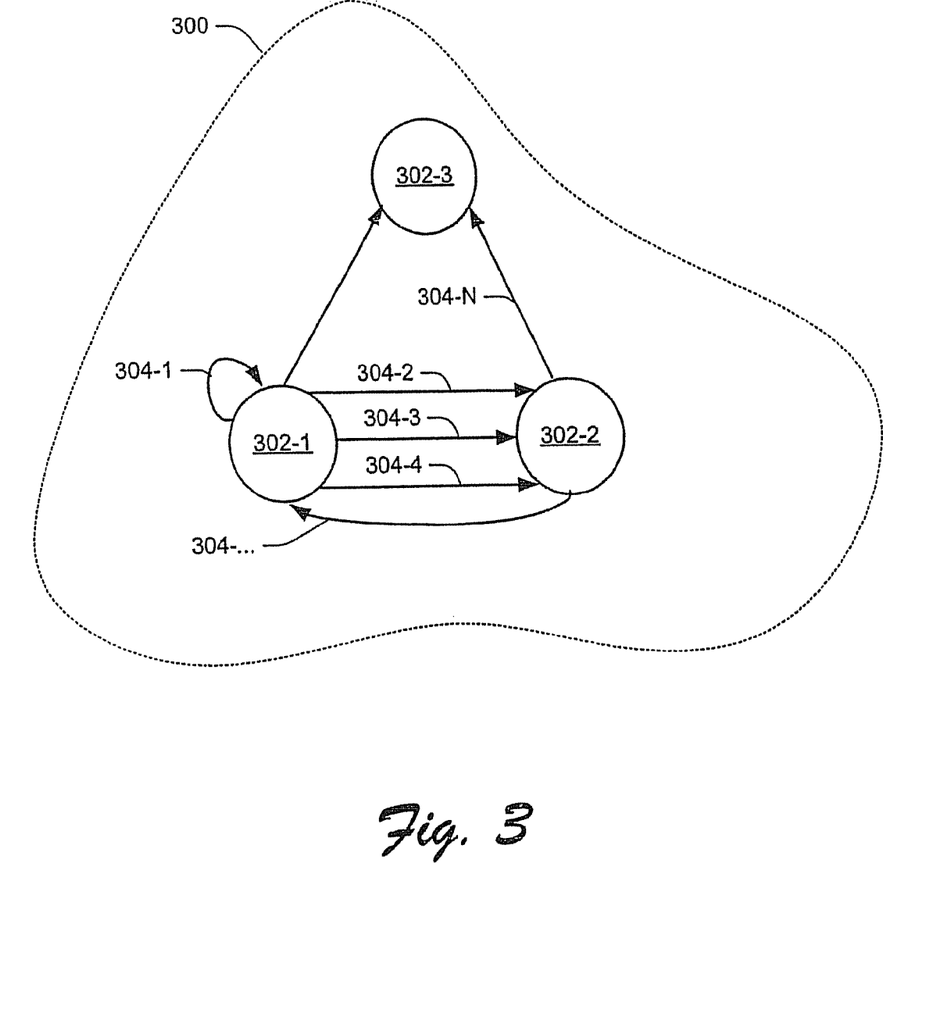
FIG. 3 shows an exemplary network of directed object relationships.

We now describe the edge E(i, j) values of graph 204(a) in view of network 300 of FIG. 3, which shows the exemplary network 300 of directed object relationships. In this exemplary network, objects 302-1, 302-2, and 302-3 have at least one edge 304 (i.e., one or more edges 304-1 through 304-N) to/from another object. For example, object 302-1 (FIG. 3) shows a looping edge 304-1 that indicates that the object has a relationship to itself (for example, a web page having a hyperlink to a point inside itself).

Referring to FIG. 2, such a looping edge is also represented in graph 204(a) at the edge value that corresponds to the intersection between row-$Node_1$ and column-$Node_1$ (i.e., E(1,1)=1). This indicates that $Node_1$ has a single relationship to itself. This type of edge is called a "loop".

In this implementation, the module 202 may generate (self-)loops in the graph 204. However, the generating module 202 can be configured not to generate loops to model systems without self-loops.

In another example to represent edges 304 of FIG. 3 with a directed scale-free graph 204(a) of FIG. 2, note that object 302-1 of FIG. 3 has three (3) edges 304-2 through 304-4 to node 302-2. In particular, the intersection of row-$Node_1$ with column-$Node_2$ (i.e., E(1,2)) shows a value of 3, which is representative of the relationship between object 302-1 of FIG. 3 to object 302-2. This type of edge is called a "multiple edge", which in general refers to two or more edges from a particular object $Node_i$ to a different object $Node_j$. In this implementation, the module 202 may generate multiple edges in the graph 204. However, in another implementation, the generating module 202 can be configured not to generate multiple edges, to model systems in which there are only single edges.

Although network 300 of FIG. 3, and graph 204(a) of FIG. 2 respectively represent/map only 3 nodes/objects, it can be appreciated that the complexity and number of objects represented/mapped by the exemplary network 300 and graph 204(a), are exemplary and could represent/map any number of objects of any complexity.

We now describe the algorithms used by the generating module 202 to generate directed scale-free object relationships in further detail.

Generating Directed Scale-Free Object Relationships

Referring to FIG. 2, the generating module 202 introduces random and probabilistic aspects during graph 204 generation to simulate dynamically created objects (e.g., web pages, etc.) and relationships between them (e.g., hyperlinks, etc.) that is/are often observed, for example, in technological (e.g., the web), cultural, natural, and/or the like, environments. Such a random aspect is obtained via iterative generating module 202 requests over time t for respective random number(s) 206 from the random number generating module (RNG) 208. The RNG 208 can be a standalone module, or a service provided by a computer program module such as the OS 158 (FIG. 1).

Some of the random numbers 206 will be required to lie between 0 (zero) and 1 (one). For each of these random numbers 206, the network generating module 202 uses the random number 206 to determine one of three possibilities, labeled (A), (B) and (C), depending on whether the random number lies between 0 (zero) and $\alpha$, $\alpha$ and $\alpha+\beta$, or $\alpha+\beta$ and $\alpha+\beta+\gamma$, respectively. The parameters $\alpha$, $\beta$ and $\gamma$ are non-negative real numbers that when added together equal one (1), i.e., $\alpha+\beta+\gamma=1$. These parameters stored as respective portions of the configuration data 210. The parameters $\alpha$, $\beta$ and $\gamma$ can be selected/determined in different manners, for example, manually preconfigured by a system administrator, programmatically configured in view of environmental measurements, etc. This allows for considerable flexibility to customize the model generating process to simulate structural and object relationships of various types of measured environments.

When the generating module 202 maps the random number 206 to the range [0, $\alpha$], the generating module 202 augments the graph 204 by adding a vertex and an edge from the new vertex into an existing (old) vertex. When the generating module 202 maps the random number 206 to the range [$\alpha$, $\alpha+\beta$], the generating module 202 augments the graph 204 by connecting two old vertices (i.e., a vertex is not added, but one of the E(i,j) values increases by one). When the generating module 202 maps the random number 206 to the range [$\alpha+\beta$, $\alpha+\beta+\gamma$], the generating module 202 augments the graph 204 by connecting an old vertex to a newly generated vertex. Additionally, during graph generation, the module 202 applies configurable constants $\delta_{in}$ and/or $\delta_{out}$ to introduce in-degree and out-degree shifts to the graph.

The degree shift, $\delta_{in}$ or $\delta_{out}$, is a non-negative parameter added to the in-degree or out-degree of a vertex, respectively. The degree shift is added before applying any other rules which are used to choose random vertices.

In light of the above, let $G_0$ be any fixed initial directed graph 204, for example, a single vertex (i.e., $Node_1$) without edges (i.e., E(1,1)=0), and let $t_0$ be the number of edges of $G_0$. The generating module 202 always adds one edge per iteration, and sets $G(t_0)=G_0$, so at time t the graph G(t) has exactly t edges, and a random number n(t) of vertices. For purposes of discussion, number(s) of edges and vertices, as well as other intermediate parameters and calculations are represented by respective portions of "other data" 212.

In the operation of the generating module 202, to choose a vertex v of G(t) according to $d_{out}+\delta_{out}$ means to choose v so that $Pr(v=v_i)$ is proportional to $d_{out}(v_i)+\delta_{out}$, i.e., so that $Pr(v=v_i)=(d_{out}(vi)+\delta_{out})/(t+\delta_{out}n(t))$. To choose v according to $d_{in}+\delta_{in}$ means to choose v so that $Pr(v=v_j)=(d_{in}(v_j)+\delta_{in})/(t+\delta_{in}n(t))$. Here $d_{out}(v_i)$ and $d_{in}(v_j)$ are the out-degree of $v_i$ and the in-degree of $v_j$, respectively, measured in the graph G(t).

For $t \geq t_0$, the generating module 202 forms G(t+1) from G(t) according the following rules:

(A) With probability $\alpha$ (see configuration data values 210), add a new vertex v together with an edge from v to an existing vertex w, where w is chosen according to $d_{in}+\delta_{in}$, so that $Pr(w=w_j) \propto (d_{in}(w_j)+\delta_{in})$. (For instance, in a web graph, add one (1) edge representing a hyperlink from vertex v to vertex w). The inputs to this algorithm are n=n(t)

vertices and t edges, and the outputs are n(t+1)=n(t)+1 vertices and t+1 edges. After adding the new vertex v=Node$_{n+1}$, the particular existing vertex w that will receive the edge from the new vertex v is determined as follows:
E(i,j)=E$_{ij}$=number of edges from vertex i to vertex j.

$$d_{in}(j) = \sum_{i=1}^{n} E_{ij}$$

At this point, the generating module 202 requests an additional random number 206 between 0 and the sum of all numbers d$_{in}$(j)+δ$_{in}$ in G(t):

$$\sum_{j=1}^{n}(d_{in}(j) + \delta_{in}) = \sum_{i=1}^{n}\sum_{j=1}^{n} E_{ij} + n\delta_{in} = t + n\delta_{in}$$

The range from 0 to t+nδ$_{in}$ is divided into n slots with lengths d$_{in}$(j)+δ$_{in}$, j=1, . . . , n. The random number 206 will fall into a particular slot j. At this point, the generating module 202 sets E(n+1,j)=1.

(B) With probability β (see configuration data values 210), add an edge from an existing vertex v to an existing vertex w, where v and w are chosen independently, v according to d$_{out}$+δ$_{out}$, and w according to d$_{in}$+δ$_{in}$, so that Pr(v=v$_i$, w=w$_j$)∝(d$_{out}$(v$_i$)+δ$_{out}$)(d$_{in}$(w$_j$)+δ$_{in}$). The inputs to this algorithm are n=n(t) vertices and t edges, and the outputs are n(t+1)=n(t) vertices and t+1 edges. The generating module 202 selects the particular existing vertex v that will add an edge to vertex w by generating a random number 206 (r$_{out}$):

r$_{out}$∈[0,t+nδ$_{out}$]

This range is divided into slots, with an i$^{th}$ slot having length d$_{out}$(i)+δ$_{out}$. The random number 206 falls into a particular slot i; the vertex v will be Node$_i$. The generating module 202 determines the vertex w that will receive the edge by generating a random number 206 (r$_{in}$) such that:

r$_{in}$∈[0,t+nδ$_{in}$]

This range is divided into slots, with the j$^{th}$ slot having length d$_{in}$(j)+δ$_{in}$. The random number 206 falls into a particular slot j; the vertex w will be Node$_j$. At this point, the generating module 202 increments E(i,j) by 1.

(C) With probability γ (see configuration data values 210, which can be calculated as γ=1−α−β), add a new vertex v and an edge from an existing vertex w to v, where w is chosen according to d$_{out}$+δ$_{out}$, so that Pr(w=w$_i$)∝(d$_{out}$(w$_i$)+δ$_{out}$). The inputs to this algorithm are n=n(t) vertices and t edges, and the outputs are n(t+1)=n(t)+1 vertices and t+1 edges. After adding the new vertex v=Node$_{n+1}$, the particular existing vertex w that will add an edge to the new vertex v is determined as follows: generate a random number (r$_{out}$) 206 according to:

r$_{out}$∈[0,t+nδ$_{out}$]

This range is divided into slots, with the jth slot having length d$_{out}$(i)+δ$_{out}$. The random number 206 falls into a particular slot i; the vertex w will be Node$_i$. Thus, the generating module 202 sets E(i,n+1)=1.

Although the generating module 202 makes no additional assumptions about the parameters, the behavior of the resulting graph is non-trivial only if certain settings of the parameters are avoided. In particular, the following parameter values can be avoided to exclude trivialities:

α+γ=0 (↔the graph does not grow)
δ$_{in}$+δ$_{out}$=0 (↔all vertices have not in G$_0$ have d$_{in}$=0 or d$_{out}$=0)
αδ$_{in}$+γ=0 (↔all vertices not in G$_0$ have d$_{in}$=0)
γ=1 (↔all vertices not in G$_0$ have d$_{in}$=1)
γδ$_{out}$+α=0 (↔all vertices not in G$_0$ have d$_{out}$=0)
α=1 (↔all vertices not in G$_0$ have d$_{out}$=1)

In one implementation, when graph 204 represents a web graph, δ$_{out}$ is set to 0. The motivation is that vertices added under rule (C) correspond to web pages which purely provide content; such pages do not change, are born without out-links and remain without out-links. In this implementation, vertices generated/added under rule (A) correspond to usual pages, to which links may be added later. While mathematically it may seem natural to take δ$_{in}$=0 in addition to δ$_{out}$=0, doing so would provide a model in which every page not in G$_0$ has either no in-links or no out-links, i.e. a trivial model.

A non-zero value of δ$_{in}$ corresponds to insisting that a page is not considered part of the web until something points to it, for example, a search engine. This allows the generating module 202 to consider edges from search engines independently/separately from the rest of the graph, since they are typically considered to be edges of a different nature (for purposes of implementing a search algorithm, for example) than other types of edges. For the same reason, δ$_{in}$ does not need to be an integer. The parameter δ$_{out}$ is included to provide symmetry to the model with respect to reversing the directions of edges (swapping α with γ and δ$_{in}$ with δ$_{out}$), and to further adapt the model to contexts other than that of the webgraph.

In one implementation, taking β=γ=δ$_{out}$=0 and α=δ$_{in}$=1, the generating module 202 includes a precise version of the special case of m=1 of the Barabási-Albert model [5], wherein m represents the number of new edges added for each new vertex A more general model than that so far described here, with additional parameters, can be generated by adding m edges for each new vertex, or (as in [14]) by adding a random number of new edges with a certain distribution for each new vertex. In implementing the description here, the main effect of the Barabási-Albert parameter m, namely varying the overall average degree, is achieved by varying β.

Another more general model than that so far described here, again with additional parameters, can be generated to describe systems in which different vertices have different fitnesses. For example, some web pages may be considered more fit or attractive than others, and may get more connections per unit time even if their degrees are not as high as those of less fit web pages. To model this, whenever the generating module 202 creates a new vertex v, the random number generator 208 will independently generate two random numbers λ(v) and μ(v) from some specified distributions D$_{in}$ and D$_{out}$, respectively, independently of each other and of all earlier choices. Then steps (A), (B) and (C) of [0041] will be modified as follows: In step (A), the existing vertex w will be chosen according to λ(w)(d$_{in}$+δ$_{in}$), so that Pr(w=w$_i$)∝λ(w$_i$)(d$_{in}$(w$_i$)+δ$_{in}$). In step (B), the existing vertex v will be chosen according to μ(v)(d$_{out}$+δ$_{out}$), and the existing vertex w will be chosen according to λ(w)(d$_{in}$+δ$_{in}$), so that Pr(v=v$_i$, w=w$_j$)∝μ(v$_i$)λ(w$_j$)(d$_{out}$(vi)+δ$_{out}$)(d$_{in}$(w$_j$)+δ$_{in}$). In step (C), the existing vertex w will be chosen according to μ(w)(d$_{out}$+δ$_{out}$), so that Pr(w=w$_i$)∝μ(w$_i$)(d$_{out}$(w$_i$)+δ$_{out}$).

An Exemplary Procedure

Figure 4:
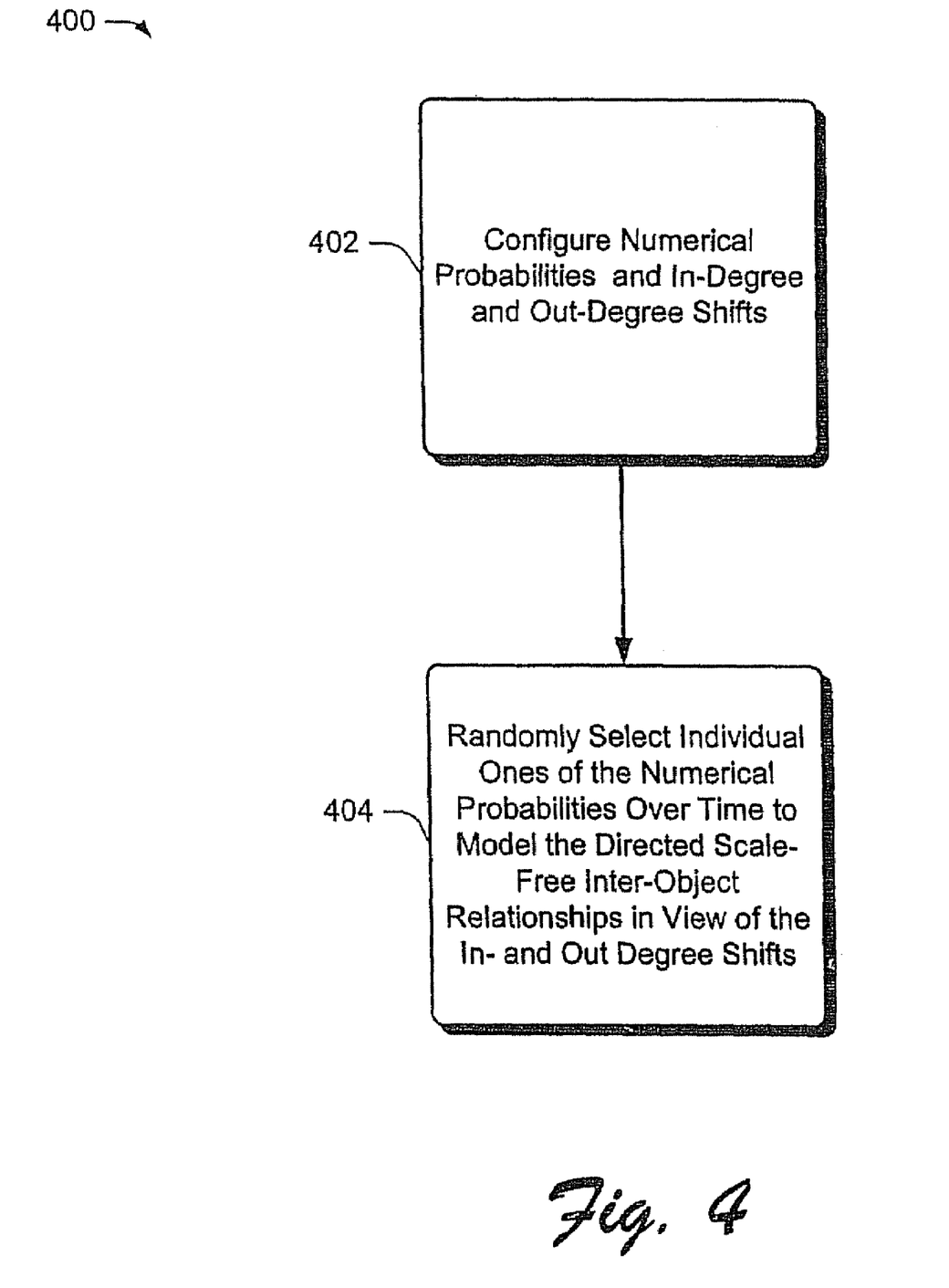
FIG. 4 shows an exemplary procedure to generate a model of directed scale-free object relationships.

FIG. 4 shows an exemplary procedure 400 to generate directed scale-free object relationships. For the purposes of discussion, these procedural operations are described in reference to program module and data features of FIGS. 1 and 2. At block 402, the generating module 202 configures numerical probabilities α, β, γ, and configurable in-degree and out-degree shift constants $\delta_{in}$ and $\delta_{out}$. At block 404, the generating module 202 generates random numbers 206 to select successive steps (A), (B), or (C) over time to generate the directed scale-free object relationships as a graph. Further random selection of vertices to/from which directed edges are added uses preferential attachment, i.e., selection according to in/out-degree respectively, as described in (A), (B) and (C) of [0042].

Conclusion

The described systems and methods generate directed scale-free object relationships. Although the systems and methods have been described in language specific to structural features and methodological operations, the subject matter as defined in the appended claims is not necessarily limited to the specific features or operations described. Rather, the specific features and operations are disclosed as exemplary forms of implementing the claimed subject matter. For instance, the described systems 100 and methods 400, besides being applicable to generation of a directed scale-free model of the web (a web graph) or some portion thereof, can also used to generate customized models of many other naturally occurring (man-made and otherwise) physical and abstract object relationships.

REFERENCES

[1] W. Aiello, F. Chung and L. Lu, A random graph model for power law graphs, *Experiment. Math.* 10 (2001), 53-66.

[2] R. Albert and A. L. Barabási, Statistical mechanics of complex networks, arXiv:cond-mat/0106096 (2001)

[3] R. Albert, H. Jeong and A. L. Barabási, Diameter of the world-wide web, Nature 401 (1999), 130-131.

[4] K. Azuma, Weighted sums of certain dependent variables, *Tōhoku Math. J.* 3 (1967), 357-367.

[5] A.-L. Barabási and R. Albert, Emergence of scaling in random networks, *Science* 286 (1999), 509-512.

[6] A.-L. Barabási, R. Albert and H. Jeong, Mean-field theory for scale-free random networks, *Physica A* 272 (1999), 173-187.

[7] A.-L. Barabási, R. Albert and H. Jeong, Scale-free characteristics of random networks: the topology of the world-wide web, *Physica A* 281 (2000), 69-77.

[8] G. Bianconi and A.-L. Barabási, Competition and multi-scaling in evolving networks, cond-mat/0011029.

[9] B. Bollobás, *Random Graphs, Second Edition*, Cambridge studies in advanced mathematics, vol. 73, Cambridge University Press, Cambridge, 2001, xvi+498 pp.

[10] B. Bollobás, Martingales, isoperimetric inequalities and random graphs. In *Combinatorics* (Eger, 1987), 113-139, Colloq. Math. Soc. János Bolyai, 52, North-Holland, Amsterdam 1988.

[11] B. Bollobás and O. M. Riordan, The diameter of a scale-free random graph, submitted for publication.

[12] B. Bollobás, O. M. Riordan, J. Spencer, and G. Tusnády, The degree sequence of a scale-free random graph process, *Random Structures and Algorithms* 18 (2001), 279-290.

[13] A. Broder, R. Kumar, F. Maghoul, P. Raghavan, S. Rajagopalan, R. Stata, A. Tomkins and J. Wiener, Graph structure in the web, *Proc 9th WWW Conf.* 309-320 (2000).

[14] C. Cooper and A. Frieze, A general model of web graphs, preprint.

[15] S. N. Dorogovtsev and J. F. F. Mendes, Evolution of random networks, preprint.

[16] P. Erdös and A. Rényi, On random graphs. I, *Publ. Math. Debrecen* 6 (1959), 290-297.

[17] P. Erdös and A. Rényi, On the evolution of random graphs, *Magyar Tud. Akad. Mat. Kutató Int. Közl.* 5 (1960), 17-61.

[18] M. Faloutsos, P. Faloutsos and C. Faloutsos, On power-law relationships of the internet topology, SIGCOMM 1999, *Comput. Commun. Rev.* 29 (1999), 251.

[19] E. N. Gilbert, Random graphs, *Ann. Math. Statist.* 30 (1959), 1141-1144.

[20] W. Hoeffding, Probability inequalities for sums of bounded random variables, *J. Amer. Statist. Assoc.* 58 (1963), 13-30.

[21] H. Jeong, B. Tombor, R. Albert, Z. N. Oltvai and A.-L. Barabási, The large-scale organization of metabolic networks, *Nature* 407 (2000), 651-654.

[22] J. Kleinberg, R. Kumar, P. Raghavan, S. Rajagopalan and A. Tomkins, The web as a graph: measurements, models, and methods, COCOON 1999.

[23] R. Kumar, P. Raghavan, S. Rajagopalan and A. Tomkins, Extracting large scale knowledge bases from the web, VLDB 1999.

[24] R. Kumar, P. Raghavan, S. Rajagopalan, D. Sivakumar, A. Tomkins and E. Upfal, Stochastic models for the web graph, FOCS 2000.

[25] M. E. J. Newman, The structure of scientific collaboration networks, *Proc. Natl. Acad. Sci USA* 98 (2001), 404-409.

[26] M. E. J. Newman, S. H. Strogatz and D. J. Watts, Random graphs with arbitrary degree distributions and their applications, *Phys. Rev. E* 64, 026118 (2001).

[27] D. Osthus and G. Buckley, Popularity based random graph models leading to a scale-free degree distribution, preprint.

[28] D. J. Watts and S. H. Strogatz, Collective dynamics of 'small-world' networks, *Nature* 393 (1998), 440-442.

Appendix A

In order to find the power laws, we fix constants α, β, γ≧0 summing to 1 and $\delta_{in}, \delta_{out} \geq 0$, and set $$c_1 = \frac{\alpha + \beta}{1 + \delta_{in}(\alpha + \gamma)} \text{ and } c_2 = \frac{\beta + \gamma}{1 + \delta_{in}(\alpha + \gamma)}.$$

We also fix a positive integer $t_0$ and an initial graph $G(t_0)$ with $t_0$ edges. Let us write $x_i(t)$ for the number of vertices of $G(t)$ with in-degree i, and $y_i(t)$ for the number with out-degree i.

Note that the in-degree distribution becomes trivial if $\alpha\delta_{in}+\gamma=0$ (all vertices not in $G_0$ will have in-degree zero) or if γ=1 (all vertices not in $G_0$ will have in-degree 1), while for $\gamma\delta_{out}+\alpha=0$ or α=1 the out-degree distribution becomes trivial. We will therefore exclude these cases in the following theorem.

Theorem 1. Let i≧0 be fixed. There are constants $p_i$ and $q_i$ such that $x_i(t)=p_i t+o(t)$ and $y_i(t)=q_i t+o(t)$ hold with probability 1. Furthermore, if $\alpha\delta_{in}+\gamma>0$ and γ<1, then as i→∞ we have $$p_i \sim C_{IN} i^{-X_{IN}},$$

where $X_{IN}=1+1/c_1$ and $C_{IN}$ is a positive constant. If $\gamma\delta_{out}+\alpha>0$ and $\alpha<1$, then as $i\to\infty$ we have $$q_i \sim C_{OUT} i^{-X_{OUT}},$$

with $X_{OUT}=1+1/c_2$ and $C_{OUT}$ is a positive constant.

In the statement above, the o(t) notation refers to $t\to\infty$ with i fixed, while $a(i)\sim b(i)$ means $a(i)/b(i)\to 1$ as $i\to\infty$.

Proof. Note first that if the initial graph has $n_0$ vertices then $n(t)$ is equal to $n_0$ plus a Binomial distribution with mean $(\alpha+\gamma)(t-t_0)$. It follows from the Chernoff bound that there is a positive constant c such that for all sufficiently large t we have $$Pr(|n(t)-(\alpha+\gamma)t|\geq t^{1/2}\log t)\leq e^{-c(\log t)^2}. \qquad (1)$$

In particular, the probability above is $o(t^{-1})$ as $t\to\infty$.

We consider how the vector $(x_0(t), x_1(t), \ldots)$, giving for each i the number of vertices of in-degree i in the graph G(t), changes as t increases by 1. Let G(t) be given. Then with probability $\alpha$ a new vertex with in-degree 0 is created at the next step, and with probability $\gamma$ a new vertex with in-degree 1 is created. More specifically, with probability $\alpha+\beta$ the in-degree of an old vertex is increased. In going from G(t) to G(t+1), from the preferential attachment rule, given that we perform operation (A) or (B), the probability that a particular vertex of in-degree i has its in-degree increased is exactly $(i+\delta_{in})/(t+\delta_{in}n(t))$. Since the chance that we perform (A) or (B) is $\alpha+\beta$, and since G(t) has exactly $x_i(t)$ vertices of in-degree i, the chance that one of these becomes a vertex of in-degree i+1 in G(t+1) is exactly $$(\alpha+\beta)x_i \frac{i+\delta_{in}}{t+\delta_{in}n(t)},$$

so with this probability the number of vertices of in-degree i decreases by 1. However, with probability $$(\alpha+\beta)x_{i-1}\frac{i-1+\delta_{in}}{t+\delta_{in}n(t)}$$

a vertex of in-degree i−1 in G(t) becomes a vertex of in-degree i in G(t), increasing the number of vertices of in-degree i by 1. Putting these effects together, $$E(x_i(t+1)\mid G(t)) = x_i(t) + \qquad (2)$$
$$\frac{\alpha+\beta}{t+\delta_{in}n(t)}((i-1+\delta_{in})x_{i-1}(t)-(i+\delta_{in})x_i(t))+\alpha 1_{\{i=0\}}+\gamma 1_{\{i=1\}},$$

where we take $x_{-1}(t)=0$, and write $1_A$ for the indicator function which is 1 if the event A holds and 0 otherwise.

Let i be fixed. We wish to take the expectation of both sides of (2). The only problem is with n(t) in the second term on the right hand side. For this, note that from a very weak form of (1), with probability $1-o(t^{-1})$ we have $|n(t)-(\alpha+\gamma)t|=o(t^{3/5})$. Now whatever value n(t) takes we have $$\frac{\alpha+\beta}{t+\delta_{in}n(t)}(j+\delta_{in})x_j(t)=O \qquad (1)$$

for each j, so $$E\left(\frac{\alpha+\beta}{t+\delta_{in}n(t)}(j+\delta_{in})x_j(t)\right)=\frac{\alpha+\beta}{t+\delta_{in}(\alpha+\gamma)t}(j+\delta_{in})Ex_j(t)+o(t^{-2/5})$$

and, taking the expectation of both sides of (2), $$Ex_i(t+1)=Ex_i(t)+\frac{\alpha+\beta}{t+\delta_{in}(\alpha+\gamma)t}((i-1+\delta_{in})Ex_{i-1}(t)-(i+\delta_{in})Ex_i(t))+$$
$$\alpha 1_{\{i=0\}}+\gamma 1_{\{i=1\}}+o(t^{-2/5}).$$

Let us write $\overline{x_i}(t)$ for the 'normalized expectation' $Ex_i(t)/t$. Recalling that $c_1=(\alpha+\beta)/(1+\delta_{in}(\alpha+\gamma))$, we have $$(t+1)\overline{x_i}(t+1)-t\overline{x_i}(t)= \qquad (3)$$
$$c_1((i-1+\delta_{in})\overline{x_{i-1}}(t)-(i+\delta_{in})\overline{x_i}(t))+\alpha 1_{\{i=0\}}+\gamma 1_{\{i=1\}}+o(t^{-2/5}).$$

Now let $p_{-1}=0$ and for $i\geq 0$ define $p_i$ by $$p_i=c_1((i-1+\delta_{in})p_{i-1}-(i+\delta_{in})p_i)+\alpha 1_{\{i=0\}}+\gamma 1_{\{i=1\}}. \qquad (4)$$

First we will show that that for each i we have $$E(x_i(t))=p_i t+o(t^{3/5}) \qquad (5)$$

as $t\to\infty$; later we shall show that $x_i(t)$ is concentrated around its mean, and then finally that the $p_i$ follow the stated power law. To see (5), set $\epsilon_i(t)=\overline{x_i}(t)-p_i$. Then subtracting (4) from (3), $$(t+1)\epsilon_i(t+1)-t\epsilon_i(t)=c_1(i-1+\delta_{in})\epsilon_{i-1}(t)-c_1(i+\delta_{in})\epsilon_i(t)+o(t^{-2/5}),$$

which we can rewrite as $$\epsilon_i(t+1)=\frac{t-c_1(i+\delta_{in})}{t+1}\epsilon_i(t)+\Delta_i(t), \qquad (6)$$

where $\Delta_i(t)=c_1(i-1+\delta_{in})\epsilon_{i-1}(t)/(t+1)+o(t^{-7/5})$.

To prove (5) we must show exactly that $\epsilon_i(t)=o(t^{-2/5})$ for each i. We do this by induction on i; suppose that $i\geq 0$ and $\epsilon_{i-1}(t)=o(t^{-2/5})$, noting that $\epsilon_{-1}(t)=0$, so the induction starts. Then $\Delta_i(t)=o(t^{-7/5})$, and from (6) one can check (for example by solving this equation explicitly for $\epsilon_i(t)$ in terms of $\Delta_i(t)$) that $\epsilon_i(t)=o(t^{-2/5})$. This completes the proof of (5).

Next we show that, with probability 1, we have $$x_i(t)/t\to p_i, \qquad (7)$$

as in the statement of the theorem. To do this we show concentration of $x_i(t)$ around its expectation using, as usual, the Azurna-Hoeffding inequality [4, 20] (see also [10]). This can be stated in the following form: if X is a random variable determined by a sequence of n choices, and changing one choice changes the value of X by at most $\theta$, then $$Pr(|X - EX| \geq x) \leq 2e^{-\frac{x^2}{2n\theta^2}}. \qquad (8)$$

To apply this let us first choose for each time step which operation (A), (B) or (C) to perform. Let A be an event corresponding to one (infinite) sequence of such choices. Note that for almost all A (in the technical sense of probability 1), the argument proving (5) actually gives $$E(x_i(t)|A) = p_i t + o(t). \qquad (9)$$

Given A, to determine G(t) it remains to choose at each step which old vertex (for (A) or (C)), or which old vertices (for (B)) are involved. There are at most 2t old vertex choices to make. Changing one of these choices from v to v', say, only affects the degrees of v and v' in the final graph. (To preserve proportional attachment at later stages we must redistribute later edges among v and v' suitably, but no other vertex is affected.) Thus $x_i(t)$ changes by at most 2, and, applying (8), we have $$Pr(|x_i(t) - E(x_i(t)|A)| \geq t^{3/4}|A) \leq 2e^{-\sqrt{t}/16}.$$

Together with (9) this implies that (7) holds with probability one, proving the first part of the theorem. (Note that with a little more care we can probably replace (7) with $x_i(t) = p_i t + O(t^{1/2} \log t)$. Certainly our argument gives an error bound of this form in (5); the weaker bound stated resulted from replacing $t^{1/2} \log t$ in (1) by $o(t^{3/5})$ to simplify the equations. However the technical details leading to (9) may become complicated if we aim for such a tight error bound.)

We now determine the behaviour of the quantities $p_i$ defined by (4).

Assuming $\gamma < 1$, we have $\alpha + \beta > 0$ and hence $c_1 > 0_1$ so we can rewrite (4) as $$(i + \delta_{in} + c_1^{-1}) p_i = (i - 1 + \delta_{in}) p_{i-1} + c_1^{-1}(\alpha 1_{\{i=0\}} + \gamma 1_{\{i=1\}}).$$

This gives $$p_0 = \alpha / (1 + c_1 \delta_{in}), \qquad (10)$$

$$p_1 = (1 + \delta_{in} + c_1^{-1})^{-1}\left(\frac{\alpha \delta_{in}}{1 + c_1 \delta_{in}} + \frac{\gamma}{c_1}\right) \text{ and, for } i \geq 1,$$

$$p_i = \frac{(i - 1 + \delta_{in})_{i-1}}{(i + \delta_{in} + c_1^{-1})_{i-1}} p_1 = \frac{(i - 1 + \delta_{in})!}{(i + \delta_{in} + c_1^{-1})!} \frac{(1 + \delta_{in} + c_1^{-1})!}{\delta_{in}!} p_1.$$

Here, for x a real number and n an integer we write $(x)_n$ for $x(x-1)\ldots(x-n+1)$. Also, we use x! for $\Gamma(x+1)$ even if x is not an integer. It is straightforward to check that the formulae we obtain do indeed give solutions. One can check that $\Sigma_{i=0}^{\infty} p_i = \alpha + \gamma$; there are $(\alpha + \gamma + o(1))t$ vertices at large times t.

From (10) we see that as $i \to \infty$ we have $p_i C_{IN} i^{-x_{IN}}$ with $$x_{IN} = (\delta_{in} + c_1^{-1}) - (-1 + \delta_{in}) = 1 + 1/c_1,$$

as in the statement of the theorem.

For out-degrees the calculation is exactly the same after interchanging the roles of $\alpha$ and $\gamma$ and of $\delta_{in}$ and $\delta_{out}$. Under this interchange $c_1$ becomes $c_2$, so the exponent in the power law for out-degrees is $x_{OUT} = 1 + 1/c_2$, as claimed.

We now turn to more detailed results, considering in- and out-degree at the same time. Let $n_{ij}(t)$ be the number of vertices of G'(t) with in-degree i and out-degree j.

Theorem 2. Assume the conditions of Theorem 1 hold, that $\alpha$, $\gamma < 1$, and that $\alpha \delta_{in} + \gamma \delta_{out} > 0$. Let $i,j \geq 0$ be fixed. Then there is a constant $f_{ij}$ such that $n_{ij}(t) = f_{ij} t + o(t)$ holds with probability 1. Furthermore, for $j \geq 1$ fixed and $i \to \infty$, $$f_{ij} \sim C_j i^{-x'_{IN}}, \qquad (11)$$

while for $i \geq 1$ fixed and $j \to \infty$, $$f_{ij} \sim D_i j^{-x'_{OUT}}, \qquad (12)$$

where the $C_j$ and $D_i$ are positive constants $$x'_{IN} = 1 + 1/c_1 + c_2/c_1(\delta_{out} + 1_{\{\gamma \delta_{out} = 0\}})$$

and $$x'_{OUT} = 1 + 1/c_2 + c_1/c_2(\delta_{in} + 1_{\{\alpha \delta_{in} = 0\}}).$$

Note that Theorem 2 makes statements about the limiting behaviour of the $f_{ij}$ as one of i and j tends to infinity with the other fixed; there is no statement about the behaviour as i and j tend to infinity together in some way.

The proof of Theorem 2 follows the same lines as that of Theorem 1, but involves considerably more calculation, and is thus given in Appendix B. The key difference is that instead of (10) we obtain a two dimensional recurrence relation (13) whose solution is much more complicated.

Before discussing the application of Theorems 1 and 2 to the web graph, note that if $\delta_{out} = 0$ (as we shall assume when modelling the web graph), vertices born with out-degree 0 always have out-degree 0. Such vertices exist only if $\gamma > 0$. Thus $\gamma \delta_{out} > 0$ is exactly the condition needed for the graph to contain vertices with non-zero out-degree which were born with out-degree 0. It turns out that when such vertices exist they dominate the behaviour of $f_{ij}$ for j>0 fixed and $i \to \infty$. A similar comment applies to $\alpha \delta_{in}$ with in- and out-degrees interchanged. If $\alpha \delta_{in} = \gamma \delta_{out} = 0$ then every vertex not in $G_0$ will have either in- or out-degree 0.

Note also for completeness that if $\gamma \delta_{out} > 0$ then (11) holds for j=0 also. If $\gamma = 0$ then $f_{i0} = 0$ for all i. If $\gamma > 0$ but $\delta_{out} = 0$, then among vertices with out-degree 0 (those born at a type (C) step), the evolution of in-degree is the same as among all vertices with non-zero out-degree taken together. It follows from Theorem 1 that in this case $f_{i0} \sim C_0 i^{-x_{IN}}$.

Particular Values

An interesting question is for which parameters (if any) our model reproduces the observed power laws for certain real-world graphs, in particular, the web graph.

For this section we take $\delta_{out} = 0$ since this models web graphs in which there are content-only pages. We assume that $\alpha > 0$, as otherwise there will only be finitely many vertices (the initial ones) with non-zero out-degree. As before, let $c_1 = (\alpha + \beta)/(1 + \delta_{in}(\alpha + \gamma))$ and note that now $c_2 = 1 - \alpha$. We have shown that the power-law exponents are $$x_{IN} = 1 + 1/c_1$$

for in-degree overall (or in-degree with out-degree fixed as 0), $$x_{OUT} = 1 + 1/c_2$$

for out-degree overall, and that if $\delta_{in} > 0$ we have exponents $$x'_{IN} = 1 + 1/c_1 + c_2/c_1$$

for in-degree among vertices with fixed out-degree $j \geq 1$, and $$x'_{OUT} = 1 + 1/c_2 + \delta_{in} c_1/c_2$$

for out-degree among vertices with fixed in-degree $i \geq 0$.

For the web graph, recently measured values of the first two exponents [13] are $X_{IN}$=2.1 and $X_{OUT}$=2.7. (Earlier measurements in [3] and [23] gave the same value for $X_{IN}$ but smaller values for $X_{OUT}$.) Our model gives these exponents if and only if $c_2$=0.59, so $\alpha$=0.41, and $c_1$=1/1.1, so $$\delta_{in} = \frac{1.1(\alpha+\beta)-1}{1-\beta}.$$

This equation gives a range of solutions: the extreme points are $\delta_{in}$=0, $\beta$=0.49, $\gamma$=0.1 and $\delta_{in}$=0.24, $\beta$=0.59, $\gamma$=0.

As a test of the model one could measure the exponents $X'_{IN}$ and $X'_{OUT}$ (which may of course actually vary when the fixed out-/in-degree is varied). We obtain 2.75 for $X'_{IN}$ and anything in the interval [2.7, 3.06] for $X'_{OUT}$.

Appendix B

In this appendix, we give the proof of Theorem 2. Arguing as in the proof of Theorem 1 we see that for each i and j we have $n_{ij}(t)/t \to f_{ij}$, where the $f_{ij}$ satisfy $$f_{ij} = c_1(i-1+\delta_{in})f_{i-1,j} - c_1(i+\delta_{in})f_{ij} + \qquad (13)$$
$$c_2(j-1+\delta_{out})f_{i,j-1} - c_2(j+\delta_{out})f_{ij} +$$
$$\alpha 1_{\{i=0,j=1\}} + \gamma 1_{\{i=1,j=0\}}.$$

Of course we take $f_{ij}$ to be zero if i or j is −1. Note that a vertex may send a loop to itself, increasing both its in- and out-degrees in one step. While this does complicate the equations for $E(n_{ij}(t))$, it is easy to see that for fixed i and j the effect on this expectation is o(t), so (13) holds exactly.

We start by finding an expansion for $f_{ij}$ when $i \to \infty$ with j fixed.

The recurrence relation (13) is of the form $$L(f) = \alpha 1_{\{i=0,j=1\}} + \gamma 1_{\{i=1,j=0\}}$$

for a linear operator L on the two-dimensional array of coefficients $f_{ij}$. It is clear from the form of L that there is a unique solution to this equation. By linearity we can write $$f_{ij} = g_{ij} + h_{ij}$$

where $$L(g) = \alpha 1_{\{i=0,j=1\}} \qquad (14)$$

and $$L(h) = \gamma 1_{\{i=1,j=0\}}. \qquad (15)$$

Let us first consider g. As $\alpha, \gamma < 1$ we have $c_1, c_2 > 0$, so setting $$b_j = \delta_{in} + \frac{1}{c_1} + \frac{c_2}{c_1}(j+\delta_{out}),$$

dividing (14) through by $c_1$ we obtain $$(i+b_j)g_{ij} = (i-1+\delta_{in})g_{i-1,j} + \frac{c_2(j-1+\delta_{out})}{c_1}g_{i,j-1} + \frac{\alpha}{c_1}1_{\{i=0,j=1\}}. \qquad (16)$$

Using (16), it is not hard to show that $g_{ij}$=0 for all i>0 if $\alpha\delta_{in}$=0. For the moment, we therefore shall assume that $\alpha\delta_{in}>0$.

Note that, from the boundary condition, we have $g_{i0}$=0 for all i. Thus for j=1 the second term on the right of (16) disappears, and we see (skipping the details of the algebra) that $$g_{i1} = a\frac{(i-1+\delta_{in})!}{(i+b_1)!}$$

where $$a = \alpha\frac{(b_1-1)!}{c_1(\delta_{in}-1)!}$$

is a positive constant. (Here we have used $\alpha\delta_{in}>0$.)

For $j \geq 2$ the last term in (16) is always zero. Solving for $g_{ij}$ by iteration, we get $$g_{ij} = \frac{c_2(j-1+\delta_{out})}{c_1}\sum_{k=0}^{i}\frac{(i-1+\delta_{in})_{i-k}}{(i+b_j)_{i-k+1}}g_{k,j-1}. \qquad (17)$$

Suppose that for some constants $A_{jr}$ we have $$g_{ij} = \sum_{r=1}^{j} A_{jr}\frac{(i-1+\delta_{in})!}{(i+b_r)!} \qquad (18)$$

for all $1 \leq j \leq j_0$ and all $i \geq 0$. Note that we have shown this for $j_0$=1, with $A_{11}$=$\alpha$. Let $j$=$j_0$+1. Then, using (17) and (18), we see that $$g_{ij} = \sum_{r=1}^{j-1}\frac{c_2(j-1+\delta_{out})}{c_1}A_{j-1,r}\sum_{k=0}^{i}\frac{(i-1+\delta_{in})!}{(i+b_j)_{i-k+1}(k+b_r)!}. \qquad (19)$$

Now it is straightforward to verify that if 0<y<x and s is an integer with $0 \leq s \leq i+1$, then $$\sum_{k=s}^{i}\frac{1}{(i+x)_{i-k+1}(k+y)!} = \frac{1}{x-y}\left(\frac{1}{(i+y)!} - \frac{(s-1+x)!}{(i+x)!(s-1+y)!}\right). \qquad (20)$$

(For example one can use downwards induction on s starting from s=i+1 where both sides are zero.) Combining (19) and the s=0 case of (20) we see that $$g_{ij} = \sum_{r=1}^{j-1}\frac{c_2(j-1+\delta_{out})}{c_1}A_{j-1,r}\frac{(i-1+\delta_{in})!}{b_j-b_r}\left(\frac{1}{(i+b_r)!} - \frac{(b_j-1)!}{(i+b_j)!(b_r-1)!}\right).$$

Collecting coefficients of $1/(i+b_r)!$ for different values of r, and noting that $b_j - b_r = (j-r)c_2/c_1$, we see that (18) holds for $j=j_0+1$, provided that $$A_{jr} = \frac{j-1+\delta_{out}}{j-r} A_{j-1,r}$$

for $1 \leq r \leq j-1$, and $$A_{jj} = -\sum_{r=1}^{j-1} \frac{j-1+\delta_{out}}{j-r} \frac{(b_j-1)!}{(b_r-1)!} A_{j-1,r}.$$  (5)

In fact we have the power law we are interested in (for g rather than f) without calculating the $A_{jr}$. Observing only that $A_{11} > 0$, so $A_{j1} > 0$ for every $j \geq 1$, the $r=1$ term domninates (18). Thus for any fixed $j > 0$ we have $$g_{ij} \sim C_j^1 i^{-1+\delta_{in}-b_1} = C_j^1 i^{-(1+1/c_1+c_2/c_1(1+\delta_{out}))}.$$  (21)

Having said that we do not need the $A_{jr}$ for the power law, we include their calculation for completeness since it is straightforward. Skipping the rather unpleasant derivation, we claim that $$A_{jr} = a(-1)^{r-1} \frac{(j-1+\delta_{out})!}{\delta_{out}!(j-1)!} \binom{j-1}{r-1} \frac{(b_r-1)!}{(b_1-1)!},$$  (25)

for the same constant $\alpha$ as above. This is easy to verify by induction on j using the relations above.

We now turn to h, for which the calculation is similar. From (15) we have $$(i+b_j)h_{ij} = (i-1+\delta_{in})h_{i-1,j} + \frac{c_2(j-1+\delta_{out})}{c_1} h_{ij-1} + \frac{\gamma}{c_1} 1_{[i=1,j=0]}.$$  (22)

Again skipping much of the algebra, for $j=0$ we see that $h_{00}=0$, while $$h_{i0} = \gamma \frac{b_0!}{c_1 \delta_{in}!} \frac{(i-1+\delta_{in})!}{(i+b_0)!}$$

for all $i \geq 1$.

If $\gamma \delta_{out} = 0$, then $h_{ij} = 0$ is zero for all $j > 0$, so let us now assume $\gamma \delta_{out} > 0$. This time the boundary condition implies that $h_{0j} = 0$ for all j. For $j \geq 1$ we thus have from (22) that $$h_{ij} = \sum_{k=1}^{i} \frac{c_2(j-1+\delta_{out})}{c_1} h_{k,j-1} \frac{(i-1+\delta_{in})_{i-k}}{(i+b_j)_{i-k+1}}.$$

(The only difference from (17) is that the sum starts with $k=1$.) Arguing as before, using the $s=1$ case of (20), we see that, for $i \geq 1$ and $j \geq 0$, $$h_{ij} = \sum_{r=0}^{j} B_{jr} \frac{(i-1+\delta_{in})!}{(i+b_r)!}, \quad \text{where}$$

-continued $$B_{jr}(-1)^r \gamma \frac{(j-1+\delta_{out})!}{j!(\delta_{out}-1)!} \binom{j}{r} \frac{b_r!}{c_1 \delta_{in}!}.$$

(This makes sense as we are assuming that $\delta_{out} > 0$.) Here the $r=0$ term dominates, and we see that for each $j \geq 0$ we have $$h_{ij} \sim C_j^{11} i^{-1+\delta_{in}-b_0} = C_j^{11} i^{-(1+1/c_1+c_2\delta_{out}/c_1)}$$  (23)

as $i \to \infty$, for some positive constant $C_j^{11}$. Returning now to $f=g+h$, considering $j \geq 1$ fixed and $i \to \infty$ we see that when $\gamma \delta_{out} > 0$, the contribution from h dominates, while if $\gamma \delta_{out} = 0$, this contribution is zero. Thus combining (21) and (23) proves (11).

The second part of Theorem 2, the proof of (12), follows by interchanging in- and out-degrees, $\alpha$ and $\gamma$ and $\delta_{in}$ and $\delta_{out}$.

What is claimed is:

1. A system that creates directed scale-free random graphs of networks comprising:
   a memory;
   one or more processors operatively coupled to the memory and disposed within one or more devices;
   a generating module that generates a directed scale-free random graph that includes a plurality of vertices and directed edges that are incrementally created in accordance with three probabilities;
   a sample directed network topology generated by the generating module;
   wherein the generating module independently generates two random numbers $\lambda(v)$ and $\mu(v)$ from specified distributions $D_{in}$ and $D_{out}$ for a new vertex v of the graph and utilizes the random numbers to update vertices of the graph by:
      choosing an existing vertex w according to $\lambda(w)(d_{in}+\partial_{in})$ such that $Pr(w=w_j) \alpha \lambda(w_j)(d_{in}(w_j)+\partial_{in})$, wherein $d_{in}$ is an in-degree shift and $\partial_{in}$ is a non-negative parameter added to the in-degree shift of a vertex, while $\alpha$ is a probability, $w_j$ is a vertical column j of vertex w and $\lambda(w)$ and $\lambda(w_j)$ are random numbers;
      choosing an existing vertex v according to $\mu(w)(d_{out}+\partial_{out})$ and a second existing vertex w according to $\lambda(w)(d_{in}+\partial_{in})$, so that $Pr(v=v_i, w=w_j) \alpha \mu(v_i)\lambda(w_j)(d_{out}(v_i+\partial_{out})(d_{in}(w_j)+\partial_{in})$, wherein $d_{out}$ is an out-degree shift and $\partial_{out}$ is a non-negative parameter added to the out-degree shift of a vertex, while $\alpha$ is the probability and $w_j$ is a vertical column j of vertex w and $v_i$ is a horizontal row of i of vertex v; and
   selecting an existing vertex w according to $\mu(w)(d_{out}+\partial_{out})$ such that $Pr(w=w_i) \alpha (w_i)(d_{out}(w_i)+\partial_{out})$; and
   a testing component that uses the sample directed network topology generated by the generating module to test directed internet routing protocols.

2. The system of claim 1, wherein the probabilities correspond to creating an edge from an existing vertex to a newly created vertex, creating an edge to an existing vertex from a newly created vertex, and creating an edge from one existing vertex to another existing vertex.

3. The system of claim 1, wherein each vertex represents a web page and each edge represents a hyperlink within the web page, a directionality of an edge points from a vertex representing a web page displaying a hyperlink to a vertex represented by the hyperlink.

4. The system of claim 1, wherein the directed edges are created both into and out of a vertex.

5. The system of claim 1, wherein an in-degree and an out-degree of the graph are distributions of power law degrees.

6. The system of claim 1, further comprising a random number generator that supplies a random number that is mapped to one of the three probabilities.

7. The system of claim 6, wherein the random number is mapped based at least in part on a configurable threshold associated with the three probabilities.

8. The system of claim 1, further comprising a database component that stores a table representation of the directed scale-free random graph, the table comprises a row for each vertex and a column for each vertex.

9. The system of claim 8, wherein the database component populates a cell, determined by an intersection of the row and the column of the table, with a number of directed vertices that point from a vertex represented by the row to a vertex represented by the column.

10. One or more computer readable media storing computer-executable instructions that, when executed, perform a method for generating directed scale-free random graphs of networks comprising:
   incrementally adding at least one of a vertex and a directed edge to a directed scale-free random graph in accordance with three probabilities;
   representing the vertex as a web page and the directed edge as a link from one web page to another in a web graph; and
   independently generating two random numbers $\lambda(v)$ and $\mu(v)$ from specified distributions $D_{in}$ and $D_{out}$ for a new vertex v of the graph; and
   utilizing the random numbers to update vertices of the graph by:
      choosing an existing vertex w according to $\lambda(w)(d_{in}+\partial_{in})$ such that $Pr(w=w_j)\alpha\lambda(w_j)(d_{in}(w_j)+\partial_{in})$. wherein $d_{in}$ is an in-degree shift and $\partial_{out}$ is a non-negative parameter added to the in-degree shift of a vertex, while $\alpha$ is a probability, $w_j$ is a vertical column j of vertex w and $\lambda(w)$ and $\lambda(w_j)$ are random numbers;
      choosing an existing vertex v according to $\mu(v)(d_{out}+\partial_{out})$ and a second existing vertex w according to $\lambda(w)(d_{in}+\partial_{in})$, so that $Pr(v=v_j, w=w_j)\alpha\ \mu(v_j)\lambda(w_j)(d_{out}(v_j)+\partial_{out})(d_{in}(w_j)+\partial_{in})$, wherein $d_{out}$ is an out-degree shift and $\partial_{out}$ is a non-negative parameter added to the out-degree shift of a vertex, while $\alpha$ is the probability and $w_j$ is a vertical column j of vertex w and $v_j$ is a horizontal row of i of vertex v; and
      selecting an existing vertex w according to $\mu(w)(d_{out}+\partial_{out})$ such that $Pr(w=w_j)\alpha(w_j)(d_{out}(w_j)+\partial_{out})$.

11. The computer readable media of claim 10, wherein the probabilities correspond to creating a vertex and an edge from an existing vertex, creating a vertex and an edge to an existing vertex, and creating an edge from one existing vertex to another existing vertex.

12. The computer readable media of claim 10, further comprising generating a random number and mapping the number to one of the three probabilities based on configurable ranges represented by the three probabilities.

13. The computer readable media of claim 10, wherein the vertex represents a web page and the edge represents a hyperlink within the web page, a directionality of the edge points from the vertex representing the web page displaying the hyperlink to a vertex representing the hyperlinked web page.

14. The computer readable media of claim 10, wherein an edge is created into a vertex and an edge is created out of a vertex.

15. The computer readable media of claim 10, wherein an in-degree and an out-degree of the graph are distributions of power law degrees.

16. The computer readable media of claim 10, further comprising creating a database that stores a table representation of the directed graph, the table comprises a row for each vertex and a column for each vertex.

17. The computer readable media of claim 16, further comprising populating a cell determined by the intersection of a row and a column of the table with a number corresponding to directed vertices that point from a vertex represented by the row to a vertex represented by the column.

18. A system for creating directed scale-free random graphs of networks comprising:
   a memory:
   one or more processors operatively coupled to the memory and disposed within one or more devices;
   means for adding at least one of newly created vertices and edges to a directed scale-free random graph based on three probabilities, the probabilities represent creating a vertex and an edge from an existing vertex, creating a vertex and an edge to an existing vertex, and creating an edge from one existing vertex to another existing vertex;
   means for creating web graphs based on the scale-free random graph;
   means for testing search algorithms on the web graphs; and
   means for independently generating two random numbers $\lambda(v)$ and $\mu(v)$ from specified distributions $D_{in}$ and $D_{out}$ for a new vertex v of the graph; and
   means for utilizing the random numbers to update vertices of the graph by:
      choosing an existing vertex w according to $\lambda(w)(d_{in}+\partial_{in})$ such that $Pr(w=w_j)\alpha\lambda(w_j)(d_{in}(w_j)+\partial_{in})$, wherein $d_{in}$ is an in-degree shift and $\partial_{in}$ is a non-negative parameter added to the in-degree shift of a vertex, while $\alpha$ is a probability, $w_j$ is a vertical column j of vertex w and $\lambda(w)$ and $\lambda(w_j)$ are random numbers;
   choosing an existing vertex v according to $\mu(v)(d_{out}+\partial_{out})$ and a second existing vertex w according to $\lambda(w)(d_{in}+\partial_{in})$, so that $Pr(v=v_j, w=w_j)\alpha\mu(v_j)\lambda(w_j)(d_{out(vj)}+\partial_{out})(d_{in}(w_j)+\partial_{in})$, wherein $d_{out}$ is an out-degree shift and $\partial_{out}$ is a non-negative parameter added to the out-degree shift of a vertex, while $\alpha$ is the probability and $w_j$ is a vertical column j of vertex w and $v_j$ is a horizontal row of i of vertex v; and
   selecting an existing vertex w according to $\mu(w)(d_{out}+\partial_{out})$ such that $Pr(w=w_j)\alpha(w_j)(d_{out}(w_j)+\partial_{out})$.

19. The system of claim 18, further comprising:
   means for generating a random number; and
   means for determining to which of the three probabilities the random number maps.

* * * * *